United States Patent [19]
Lorenzo

[11] Patent Number: 6,035,806
[45] Date of Patent: Mar. 14, 2000

[54] FLUID APPLICATOR COMB WITH RESERVOIR HANDLE

[75] Inventor: John C. Lorenzo, Bloomfield, N.J.

[73] Assignee: LDG Enterprises, Inc., N.J.

[21] Appl. No.: 09/189,032

[22] Filed: Nov. 10, 1998

Related U.S. Application Data

[60] Provisional application No. 60/065,207, Nov. 12, 1997.

[51] Int. Cl.⁷ .................................................. A01K 13/00
[52] U.S. Cl. .............................................................. 119/603
[58] Field of Search ...................................... 119/602, 603, 119/604, 605, 606, 608, 609

[56] References Cited

U.S. PATENT DOCUMENTS

| | | |
|---|---|---|
| Re. 25,585 | 5/1964 | Birch et al. . |
| 710,269 | 9/1902 | Harrison . |
| 1,462,400 | 7/1923 | Warren . |
| 1,546,638 | 7/1925 | Evans . |
| 1,664,168 | 3/1928 | Harris . |
| 1,693,248 | 11/1928 | Newton . |
| 1,704,959 | 3/1929 | Ames . |
| 1,829,021 | 10/1931 | Sinclair . |
| 2,265,972 | 12/1941 | Pearson . |
| 2,470,024 | 5/1949 | Francis . |
| 2,532,001 | 11/1950 | Williams . |
| 2,582,533 | 1/1952 | Dixon . |
| 2,626,617 | 1/1953 | Sullivan . |
| 2,647,490 | 8/1953 | Twiet ....................................... 119/605 |
| 2,956,570 | 10/1960 | Stanford . |
| 3,353,721 | 11/1967 | Love . |
| 3,368,569 | 2/1968 | Lawrence . |
| 3,612,706 | 10/1971 | Verga . |
| 4,183,328 | 1/1980 | Lawrence . |
| 4,237,822 | 12/1980 | Kaiser, Jr. . |
| 4,254,738 | 3/1981 | Stanley . |
| 4,543,913 | 10/1985 | Wilkeson . |
| 4,557,619 | 12/1985 | DeVincentis . |
| 4,902,154 | 2/1990 | Valenza . |
| 4,913,172 | 4/1990 | Chou ....................................... 119/603 |
| 4,922,859 | 5/1990 | Durell et al. . |
| 5,056,480 | 10/1991 | Murray, Sr. . |
| 5,125,423 | 6/1992 | Butterbrodt . |
| 5,311,887 | 5/1994 | Ramsey . |
| 5,325,878 | 7/1994 | McKay . |
| 5,339,839 | 8/1994 | Forcelledo et al. . |
| 5,555,899 | 9/1996 | Foreman . |
| 5,803,093 | 9/1998 | Romano . |
| 5,845,603 | 12/1998 | Efaw ....................................... 119/605 |

*Primary Examiner*—Thomas Price
*Attorney, Agent, or Firm*—Anthony J. Casella; Gerald E. Hespos

[57] ABSTRACT

An applicator comb is provided for applying medicated liquid solution to and/or near the skin of a pet. The applicator comb includes a reservoir handle molded from a resiliently deformable plastic material. An applicator head is attached to the reservoir handle and includes a hollow body and a plurality of tines projecting from the hollow body. Each tine includes a passage extending axially therethrough for delivering the medicated liquid from the reservoir handle, through the hollow body and out of the tines.

12 Claims, 3 Drawing Sheets

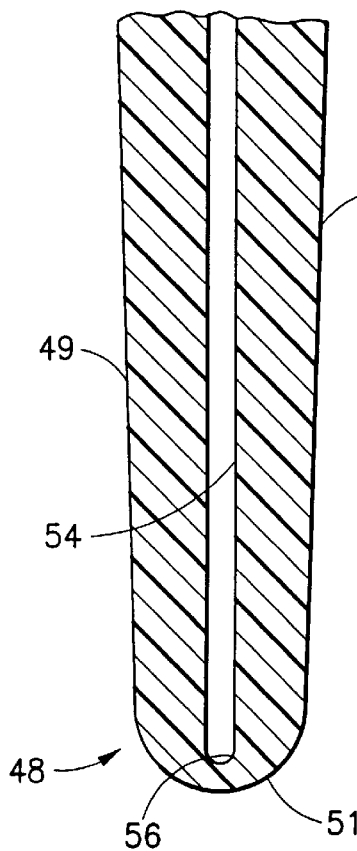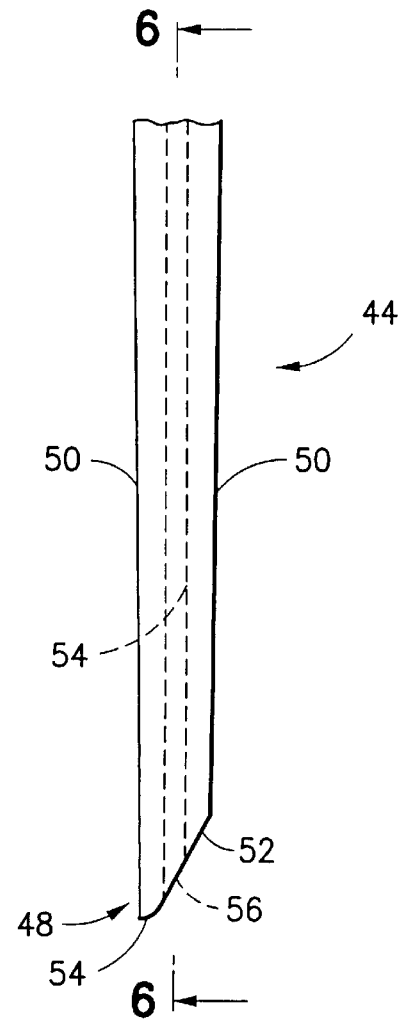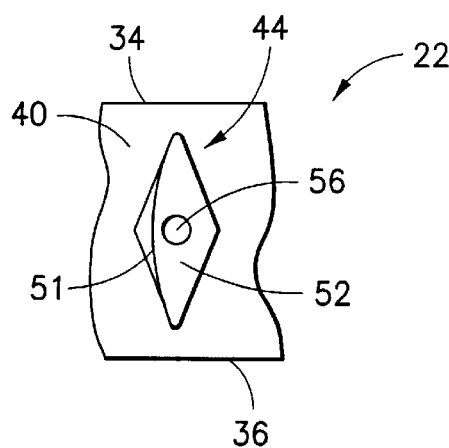
FIG.6　　FIG.5
FIG.7

FLUID APPLICATOR COMB WITH RESERVOIR HANDLE

This application claims the benefit of U.S. Provisional Patent Appl. No. 60/065,207, filed Nov. 12, 1997.

BACKGROUND OF THE INVENTION

1. Field of the Invention

The subject invention relates to veterinary products, and particularly a comb for applying a medicated liquid to the hair and/or skin area of a pet.

2. Description of the Prior Art

Most pets require periodic grooming with a comb or brush. Grooming with a brush or comb eliminates minor entanglements and avoids unsightly and frequently painful matting.

The dense hair of most pets provides an ideal environment for insect infestation, yeast infection, bacterial infections and a host of other skin and hair conditions that are unsightly, unhealthy and frequently painful. Treatment and prevention of the skin and hair ailments of pet animals often requires the application of a medicated liquid, gel or cream. A medicated product typically must be applied over a large area of the pet, and frequently must be provided over the entire pet. This widespread application of the medicated product reflects the fact that parasitic insects and bacteria are highly mobile within the coat of the pet, and can merely move to an untreated location. A surface application of medicated liquid, gel or cream often will not penetrate through the hair and to the skin of the pet. Difficulties of accessing the skin reflect the thickness of the coat on many pets and the liquid repellant oils that may exist in the coats of many pets.

The prior art has included many attempts to provide combs or brushes to facilitate the application of liquid medication to the skin and coats of pets. For example, U.S. Pat. No. 710,269 shows a comb with a cylindrical base, including a handle at one end. The end of the base opposite the handle includes a plurality of threadedly tapped apertures. Separate tines are threaded into each of the respective apertures. Each tine is substantially cylindrical, and include an aperture extending entirely therethrough. A spring biased valve is mounted in each tine and has an actuator extending through a passage at the end of the tine remote from the handle. Pressure on this actuator will open the valve in each tine to permit a flow of liquid. This comb would be prohibitedly expensive to manufacture. Furthermore, the large cylindrical tines would not be suitable for movement through the dense coat of many pets.

U.S. Pat. No. 1,546,638 shows another comb for dispensing liquid. This comb also includes a hollow handle that is connectable to a reservoir of the liquid. The comb includes a plurality of cylindrical tines having passages extending centrally therethrough. The passages communicate with the hollow handle for delivering the liquid from the handle to the ends of the tines. Once again, the cylindrical tines with the blunt ends are not well suited to movement through the dense coat of most pets. Additionally, the egress openings of the passages at the extreme distal end of each tine would quickly become clogged by skin debris urged into these egress openings as part of normal movement of the comb. Furthermore, the comb shown in U.S. Pat. No. 1,546,638 would be prohibitedly expensive to manufacture. U.S. Pat. Nos. 1,664,168, 1,693,248, 1,704,959 and 2,265,972 all show combs that are similar to the comb of U.S. Pat. No. 1,546,638. The cylindrical tines on each of these combs are not configured for movement through the dense coat of many pets. Furthermore, each of these combs would be very difficult and expensive to manufacture.

U.S. Pat. Nos. 2,470,024, 2,582,533, 2,956,570 and 3,368,569 all are directed to combs having a reservoir handle, an elongate support and tines extending perpendicularly from the elongate support. The comb in each of these patents includes a channel extending from the reservoir through the support and to apertures disposed between the respective tines. Thus, the tines can work their way through the hair, and a fluid can be applied through the apertures in the support from which the tines extend. However, the portions of the comb support having the apertures would be disposed adjacent the top or outer surface of the hair. Thus, combs of this type would offer little benefit over the mere application of medicated solution to the top surface of the hair of a pet. As noted above, in many situations the medicated solution applied to the surface of the coat of a pet would not penetrate through that coat, and hence would not reach areas of the skin requiring treatment. U.S. Pat. No. 3,612,706 shows a similar structure, but is intended for use with a toothbrush. More particularly, a toothpaste is urged into a space between conventional bristles of a toothbrush. Reissue Pat. No. Re. 25,585 shows another similar structure for directing a liquid between bristles of a brush or between tines of a comb.

All of the above-described references appear to be designed and intended for use by humans on their own hair. The prior art does, however, include patents directed to liquid dispensing brushes for pets. For example, U.S. Pat. No. 4,237,822 shows a medicated brush for a pet. The brush includes a rigid, solid handle and a hollow head connected to the handle. One side of the head includes conventional bristles. The opposed side of the head includes a rectangular array of substantially cylindrical projections, each of which has a rounded end remote from the head of the brush. Each projection further includes an axial passage which communicates with the reservoir within the hollow head of the brush. Fluid is intended to be dispensed from the reservoir in the hollow head of the brush through the passage formed centrally in each cylindrical projection. Once again, these cylindrical projections with rounded bottoms are not well suited to working their way through the tangled coat of a pet. Thus, the pet's coat would have to be untangled initially by the conventional bristles on one side of the brush. The opposed side of the brush with the cylindrical projections then could possibly be worked through the coat for applying liquid to the vicinity of the skin. The cylindrical projections of this complex brush are diametrically much greater than the conventional bristles on the brush. Thus, even a careful working with the conventional bristles would not provide assurance that the cylindrical projections could be worked through the pet's coat for applying the liquid to the region of the skin. Furthermore egress openings at the extreme distal end of each bristle would be clogged by skin debris. Once again, the apparatus shown in this patent would be extremely difficult and costly to manufacture.

U.S. Pat. No. 4,254,738 is directed to a no tangle pet brush. The brush includes conventional bristles extending from a head. A pump spray is disposed in the head and can be actuated to direct a fine mist of liquid between the respective bristles. This brush would not be well suited to applying medicated material that is not capable of generating an aerosol mist. Furthermore, this brush merely would apply the liquid to the outer surface of the coat, and would not necessarily penetrate to the skin.

U.S. Pat. No. 4,543,913 is directed to a brush having a flexible handle and a plurality of flexible substantially cylindrical or frustom shaped bristles. Some of the bristles include a central aperture that communicates with the reservoir in the hollow handle. These hollow bristles terminate at small slots that normally are in a substantially closed condition. Movement of the brush in one direction will cause these hollow projections to deflect in a direction that tightly closes the slits. However, movement of the brush in the opposed direction will deflect the hollow members in a direction that will slightly open the slits. Once again, these blunt ended hollow members are not well suited to working their way through the tangled coat of a pet. Furthermore, this brush would be difficult and costly to manufacture, and the theoretically openable slits would be difficult to control. Additionally, the requirement for flexibility of the hollow members would further reduce the effectiveness for working the brush through tangled hair on many pets.

U.S. Pat. No. 4,902,154 shows a veterinary brush similar to the above-described U.S. Pat. No. 4,543,913. However, instead of providing deflectable hollow members with slits that are selectively opened or closed, U.S. Pat. No. 4,902, 154 shows a slide member adjacent the reservoir of fluid. The slide member includes spaced apart apertures that are selectively alignable with or offset from the hollow members through which a liquid may be dispensed. Once again, this device is very complex and costly to manufacture and the tines are not well suited to working their way through a tangled coat of a pet.

U.S. Pat. No. 5,056,480 shows a comb with a hollow reservoir handle having two separate reservoirs and an ability to open one reservoir while closing the other reservoir. The comb of U.S. Pat. No. 5,056,480 includes a first array of hollow substantially cylindrical tines that communicate with the first reservoir and a second array of hollow substantially cylindrical tines that communicate with the second reservoir. The distal end of each tine is rounded hemispherically and includes an opening that communicates with the hollow interior of the tine and with the associated reservoir. Once again, these blunt-ended tines are not configured for untangling the coat of a pet.

In view of the above, it is an object of the subject invention to provide a comb that enables application of a flowable medication to the skin and coat of a pet.

It is another object of the subject invention to provide a liquid applicator comb that is easily and inexpensively manufacturable.

It is another object of the subject invention to provide a liquid applicator comb that can be reused with different supplies of a flowable medication.

It is still a further object of the subject invention to provide a liquid applicator comb that is well suited to working through a dense coat of hair on a pet, while simultaneously preventing damage or injury to the skin of the pet.

It is still a further object of the subject invention to provide an applicator comb for uniformly delivering medication to each of the applicator tines.

SUMMARY OF THE INVENTION

The subject invention is directed to an applicator comb for pets. The applicator comb includes a reservoir handle and an applicator head. The handle may be a generally cylindrical bottle having a neck for releasable attachment of the applicator head. For example, the reservoir handle may include a neck with an array of external threads, and the head may include a mateable array of internal threads. The reservoir handle may be blow molded or otherwise formed from a plastic or elastomeric material and may be resiliently deformable for urging medication in the reservoir handle toward the applicator head.

The applicator head includes a hollow body and a plurality of tines extending from the body. The applicator head is molded from a substantially rigid thermoplastic material, and preferably is injection molded as two halves. Each half will include one longitudinal half of each tine of the comb, and one longitudinal half of the hollow body that provides communication between the reservoir handle and the tines. The tines preferably define a single linear array of substantially parallel tines. Each tine has a proximal end unitary with a wall of the hollow body and a distal end remote from the hollow body. Each tine may be substantially a parallelepiped along most of its length. However, the distal portions of the respective tines may be slightly tapered. The distal end of each tine is sharply bevelled, such as a bevel at approximately 30° to the axis of the respective tines. The portion of the bevel defining the extreme distal end of each tine may be rounded slightly in the plane defined by each bevel. Thus, in one direction a fairly sharp end is defined by the bevel for permitting efficient movement of the comb through the tangled hair of a pet. However, the extreme distal end of each tine is rounded to prevent pain or injury to the pet.

Each tine includes a central passage extending therethrough and communicating with the manifold formed by the hollow body of the applicator head. The distal end of each passage extends substantially centrally through the bevelled surface defined at the distal end of each tine. Thus, the distal end of each passage is very near to the distal end of each tine, but does not result in a blunt distal end for each tine as had existed in many prior art applicator combs discussed above. Additionally, this location of the egress opening of each passage will not be pressed against the skin of the pet, and hence will not become clogged by skin debris. Consequently, the tines are configured to facilitate untangling of a pet's hair, while simultaneously delivering a medicated liquid very close to the extreme distal end of each tine.

The applicator comb is used by threadedly attaching or fixedly attaching the applicator head to a reservoir handle. The handle preferably is resiliently deformable for urging liquid from the reservoir handle toward the applicator head in response to a squeezing of the reservoir handle. Liquid will flow into the manifold of the applicator head and substantially will be distributed evenly to the passages through each of the tines. The bevel at the distal end of each tine enables the tines to work through entangled pet hair. However, the arcuate shape of the extreme distal edge of each tine for the bevel prevents inflicting pain or injury to the pet. The passageways through each tine enable the liquid medication to be delivered sufficiently close to the extreme distal end of the tine for treating skin conditions on the pet.

BRIEF DESCRIPTION OF THE DRAWINGS

FIG. 5 is a side elevational view of a tine.

FIG. 6 is a cross-sectional view taken along line 6—6 in FIG. 5.

FIG. 7 is a front elevational view showing a single tine.

DETAILED DESCRIPTION OF THE PREFERRED EMBODIMENTS

Figure 1:
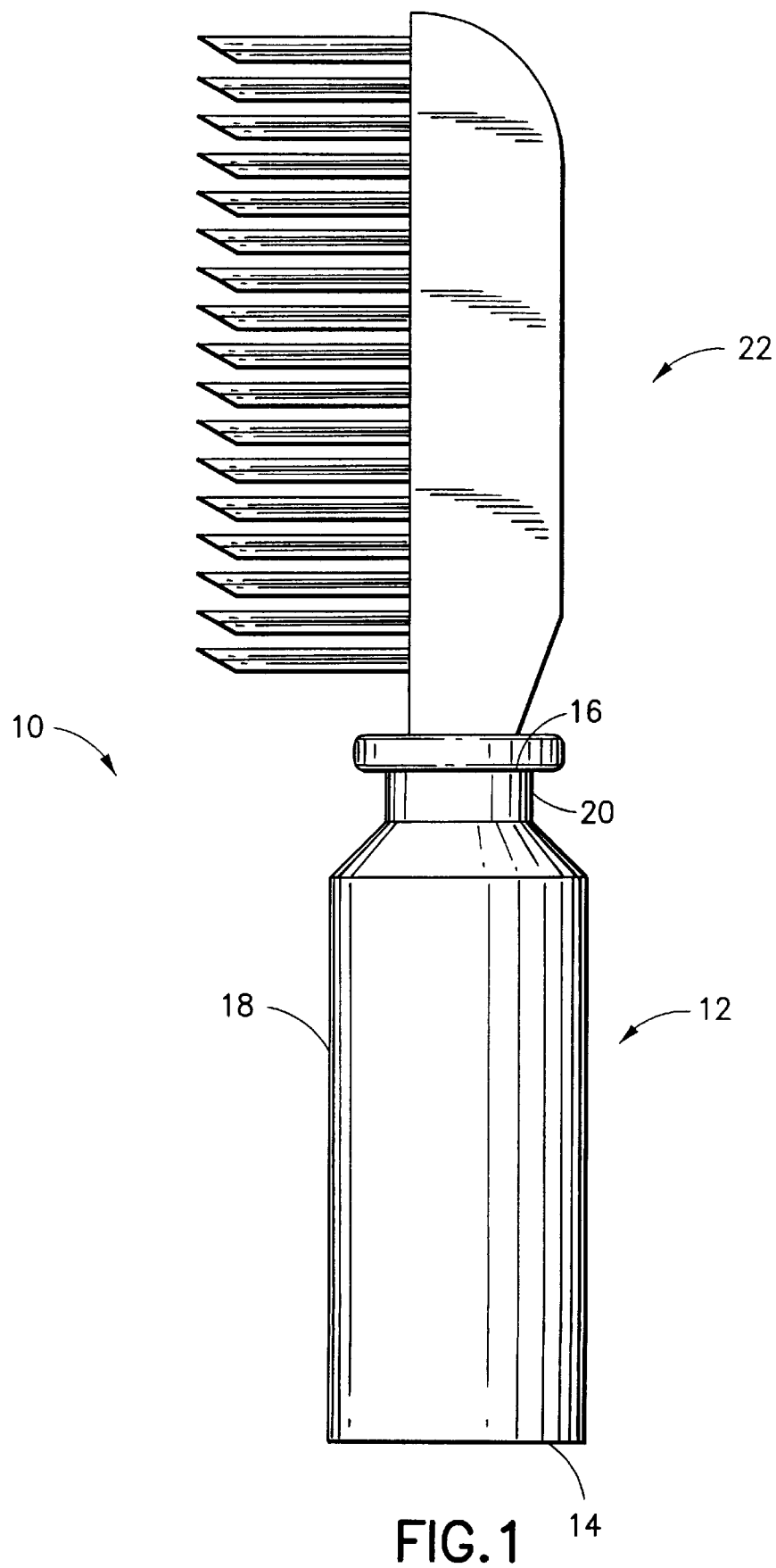
FIG. 1 is a side elevational view of an applicator comb in accordance with the subject invention.

An applicator comb in accordance with the subject invention is identified generally by the numeral 10 in FIG. 1. The applicator comb 10 includes a reservoir handle 12 having a closed bottom 14, an open top 16 and a substantially cylindrical side wall 18 extending therebetween. Major portions of the reservoir handle 12 may be blow molded from a resilient plastic or elastomeric material that enables the reservoir handle 12 to be squeezed for dispensing a liquid medicine therefrom as explained further below. Portions of the reservoir handle near the open top 16 define a substantially cylindrical neck 20. The cylindrical neck 20 may be rigid and may be molded separately from resilient portions of the reservoir handle 12. The rigid neck 20 then may be adhered or bonded to the remainder of reservoir handle 12. Portions of the rigid neck 20 may be molded to include an array of threads.

Figure 2:
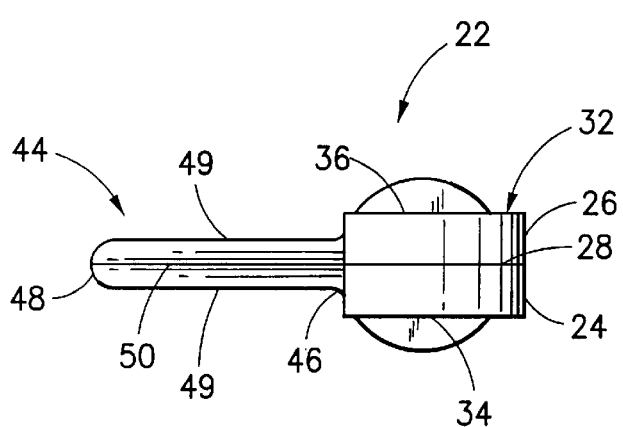
FIG. 2 is a top plan view of the applicator head of the comb shown in FIG. 1.
Figure 3:
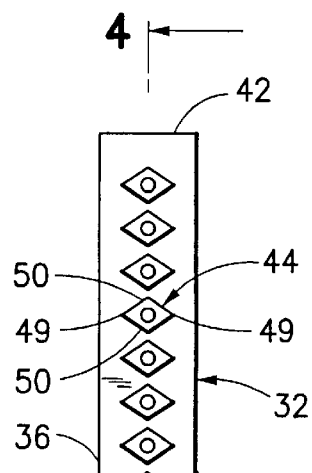
FIG. 3 is a front elevational view of the applicator head of the comb shown in FIG. 1.

The applicator comb 10 further includes an applicator head 22. The applicator head is assembled from two unitarily molded halves 24 and 26 which are shown most clearly in FIG. 2. The halves 24 and 26 are bonded or adhered to one another along the plane 28 shown in FIG. 2.

Figure 4:
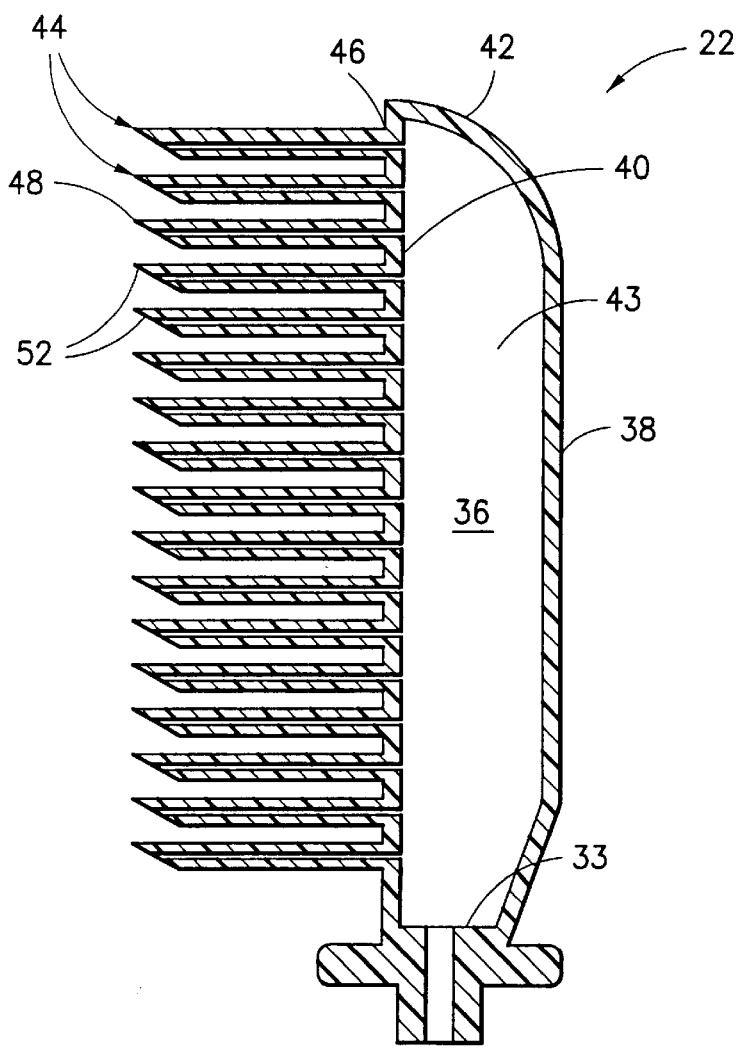
FIG. 4 is a cross-sectional view taken along line 4—4 in FIG. 3.

The applicator head 22 includes a generally cylindrical mounting collar 30 that may have an array of threads (not shown) dimensioned for mating with the threads on the collar 20 of the reservoir handle 12. A hollow body 32 extends from the mounting collar 30 and includes a bottom wall 33 that extends rigidly perpendicular to the cylindrical mounting 30. Substantially parallel side walls 34 and 36 extend rigidly from the bottom wall 33 and opposed back and front walls 38 and 40 extend from the bottom wall 33 and between the side walls 34 and 36. The front wall 40 is substantially orthogonal to the side walls 34 and 36. However, portions of the back wall 38 closest to the mounting collar 30 flare slightly away from the front wall 40. The hollow body 32 further includes an top wall 42 that curves from the back wall 38 to the front wall 40. With this construction, as shown most clearly in FIG. 4, an arcuate manifold 43 is defined within the body 32. The manifold communicates directly with the mounting collar 30, and hence communicates with the reservoir handle 12.

A plurality of substantially identical parallel tines 44 orthogonally and unitarily from the bottom wall 40 of the body 32. Each tine 44 includes a proximal end 46 adjacent the bottom wall 40 of the body 32 and a distal end 48 remote from the body 32. Each tine 44 defines a substantially parallelepiped continuously along most of its length from the proximal end 46 to a location near the distal end 48. The parallelepiped is configured to define a pair of opposed acute angle corners 49 substantially aligned with the respective sides of the comb 10 and a pair of opposed obtuse angle corners 50 aligned with plane 28 centrally between the sides of the comb.

Each tine 44 further includes a substantially planar chamfer 52 adjacent the distal end 48. The planar chamfers 52 are substantially parallel to one another and are substantially perpendicular to the plane 28 passing centrally through the array of parallel tines 40. Additionally, the chamfers 52 are oriented such that the tines 40 are all longest along portions of each tine 40 nearest the top wall of the comb and along the plane 28. Preferably, the chamfer 52 defines an angle of approximately 30° with respect to the axis of the respective tine. The respective chamfers 52 could be oriented exactly oppositely such that each tine was longest at the portion closest to the bottom wall of the comb. However, angular orientations of a chamfer other than these two preferred orientations would be much less desirable in that they would yield a less effective movement of the comb through the dense hair of a pet.

To prevent injury or pain to the pet, the extreme distal end 48 of each tine 44 defines an edge 51 that is rounded slightly in a side-to-side direction, as shown most clearly in FIG. 6. This configuration results in the comb presenting well defined edges adjacent the sides and distal end 48 of each tine 44, without defining a sharp point that could cause injury or pain.

Each tine 44 is provided with a central passage 54 that extends continuously from the proximal end 46 to the distal end 48. Each passage 54 defines a diameter of approximately 0.3". The passages 54 have an egress location 56 substantially centrally disposed on the planar chamfer 52 of each tine 44. This egress 56, therefore, is very close to the extreme distal end 48 of each tine 44 without causing a blunting of the distal end.

The applicator comb 10 is employed by holding the reservoir handle 12 with one hand and urging the applicator head 22 through the coat of the pet. The applicator head 22 is moved substantially in the manner of a conventional comb, such that the respective tines 44 are pointing substantially in the direction of movement of the applicator comb 10. Thus, the distal ends 48 of the respective tines 44 are urged into the dense coat of the pet. The distal ends 48 of the tines 44 efficiently enter the spaces between hairs of the pet and untangle the hair as the applicator head 22 moves through the coat. This movement of the applicator head 22 and the untangling is facilitated by the parallelepiped configuration of each tine 44 with the acute angle edges and the distal end edge 51 defined by the planar chamfers 52 effectively leading the comb through the coat of the pet. Simultaneously with the movement of the applicator head 22 through the coat of the pet, the reservoir handle 12 is squeezed to urge the liquid from the reservoir handle 12 into the hollow body 22 of the applicator head 22 and through the passages 54 of the respective tines 44. Medicated liquid will flow from the respective egress apertures 56 on the planar chamfers 52 adjacent the distal ends 48 of the respective tines 44. Thus, the medicated liquid will be deposited very close to the skin of the pet for achieving optimum treatment and maximum penetration.

While the invention has been described with respect to a preferred embodiment, it is apparent that various changes can be made without departing from the scope of the invention as defined by the appended claims. For example, the size and shape of the reservoir handle 12 and the hollow body 32 in the applicator head 22 can be varied. Additionally, the orientation of the respective planar chamfers may be rotated substantially 180°. These and other changes will be apparent to a person skilled in this art after having read the subject disclosure.

What is claimed is:

1. An applicator comb for applying liquid solutions to hair and adjacent areas of skin, comprising a reservoir handle for containing the liquid solution to be applied, said reservoir handle being formed from a resiliently deformable material such that inward deformation of said reservoir handle urges fluid from said handle, and an applicator head attached to said reservoir handle, said applicator head including a substantially rigid hollow body defining a manifold therein, said manifold being in fluid communication with said reservoir handle, a plurality of elongate rigid parallel tines extending from said body, said tines being disposed to be bisected longitudinally by a plane of symmetry, each said tine having a proximal end integral with said body and a distal end remote from said body, each said tine having a planar chamfer adjacent said distal end, said chamfers of said tines being substantially parallel to one another and being orthogonal to said plane of symmetry, each said tine being formed with a substantially linearly aligned passage extending centrally therethrough and extending from said manifold to an egress opening substantially centrally disposed on the planar chamfer of the respective tine, said rigid tines enabling said egress openings to be in always-opened conditions for dispensing fluid in response to inward deformation of said reservoir handle independent of any direction of movement of said tines.

2. The applicator comb of claim 1, wherein each said planar chamfer is aligned at approximately a 30° angle to the sage of the respective tine.

3. The applicator comb of claim 1, wherein said passages are of substantially uniform cylindrical shape entirely along their respective lengths.

4. The applicator comb of claim 1, wherein said tines are substantially equally spaced from one another.

5. The applicator comb of claim 1, wherein said reservoir handle includes a closed bottom, an open top and a cylindrical side wall extending therebetween, said open top of said reservoir handle being securely connected to said applicator head.

6. An applicator comb for applying liquid solutions to hair and skin adjacent the hair, said applicator comb comprising a reservoir handle for containing a liquid solution to be applied, an applicator head attached to said reservoir handle, said applicator head including a substantially rigid hollow body defining a manifold therein, said manifold being in fluid communication with said reservoir handle, a plurality of elongate rigid parallel tines extending from said body, said tines being disposed to be bisected longitudinally by a plane of symmetry, each said tine having a proximal end integral with said body and a distal end remote from said body, each said tine having a planar chamfer adjacent said distal end, said chamfers of said tines being substantially parallel to one another and being orthogonal to said plane of symmetry, each said tine being formed with a passage extending centrally therethrough and extending from said manifold to an egress opening substantially centrally disposed on the planar chamfer of the respective tine, wherein each said tine defines a parallelepiped from said proximal end to a location in proximity to said distal end.

7. The applicator comb of claim 6, wherein the parallelepiped includes a pair of opposed acute angle corners, and a pair of opposed obtuse angle corners, said obtuse angle corners of each said tine lying substantially along said plane of symmetry.

8. The applicator comb of claim 7, wherein said distal end of each said tine defines a rounded edge for preventing infliction of pain to the pet.

9. An applicator comb for applying liquid solutions to hair and skin adjacent the hair, said applicator comb comprising a reservoir handle for containing a liquid solution to be applied, an applicator head attached to said reservoir handle, said applicator head including a substantially rigid hollow body defining a manifold therein, said manifold being in fluid communication with said reservoir handle, a plurality of elongate rigid parallel tines extending from said body, said tines being disposed to be bisected longitudinally by a plane of symmetry, each said tine having a proximal end integral with said body and a distal end remote from said body, each said tine having a planar chamfer adjacent said distal end, said chamfers of said tines being substantially parallel to one another and being orthogonal to said plane of symmetry, each said tine being formed with a passage extending centrally therethrough and extending from said manifold to an egress opening substantially centrally disposed on the planar chamfer of the respective tine, wherein said body includes a bottom wall adjacent said applicator handle, a pair of opposed substantially parallel side walls projecting orthogonally from said bottom wall, a front wall projecting orthogonally from said bottom wall and extending orthogonally between said side walls, a back wall flaring outwardly from said bottom wall and connecting said side walls and a top wall extending arcuately from said back wall and connecting to said front wall and said side walls, said tines projecting orthogonally from said front wall of said body such that the outwardly flared portions of the back wall and the arcuate portions of said top wall are in opposed relationship to said tines for channeling said liquid material toward said passages of said tines.

10. The applicator comb of claim 9, wherein said reservoir handle is formed from a resiliently deformable material such that inward deformation of said reservoir handle urges fluid from said handle into said manifold of said applicator body and through said passages of said tines.

11. An applicator comb for applying liquid solutions to hair and areas of skin adjacent the hair comprising a reservoir handle formed from a resiliently deformable material and having a closed bottom, an open top and a side wall extending continuously between said closed bottom and said open top, an applicator head secured to portions of said reservoir handle in proximity to said open top, said applicator head including a hollow body having a bottom wall with an aperture extending therethrough and communicating with said reservoir handle, a pair of substantially parallel spaced apart side walls extending rigidly from said bottom wall, a front wall extending rigidly from said bottom wall and extending rigidly between said side walls, a rear wall extending from said bottom wall and connecting said side walls and an arcuate top wall extending from said rear wall to said front wall and between said side walls such that a manifold is defined within said body of said applicator head, a plurality of parallel tines extending rigidly and substantially orthogonally from said front wall of said body of said applicator head, each said tine having a proximal end integral with said bottom wall of said body and a distal end remote from said body, each said tine further defining a parallelpiped along a major portion of said tine extending from said proximal end toward said distal end, said parallelpiped being configured and oriented to have a pair of opposed acute angle corners substantially aligned with said opposed sides of said body and a pair of obtuse angle corners extending from locations on said bottom wall of said body substantially centrally between said side walls of said body, each said tine further having a chamfer extending from said distal end, said chamfers being substantially parallel to one another and being aligned such that said distal end of each said tine is substantially aligned with one of said obtuse angle corners of said tine, said distal end being rounded in a side-to-side direction for preventing said chamfer from causing pain to the skin adjacent the hair, each said tine further being provided with an aperture extending centrally therethrough from said manifold to an egress opening disposed substantially centrally on the planar chamfer of each said respective tine.

12. The applicator comb of claim 11, wherein said applicator head is formed from a high density polyethylene.

* * * * *